Oct. 4, 1932.  W. F. CAHOON  1,880,780
TRANSMITTER FOR FLUID PRESSURE AND ELECTRIC CURRENT
Filed Aug. 17, 1931  3 Sheets-Sheet 1
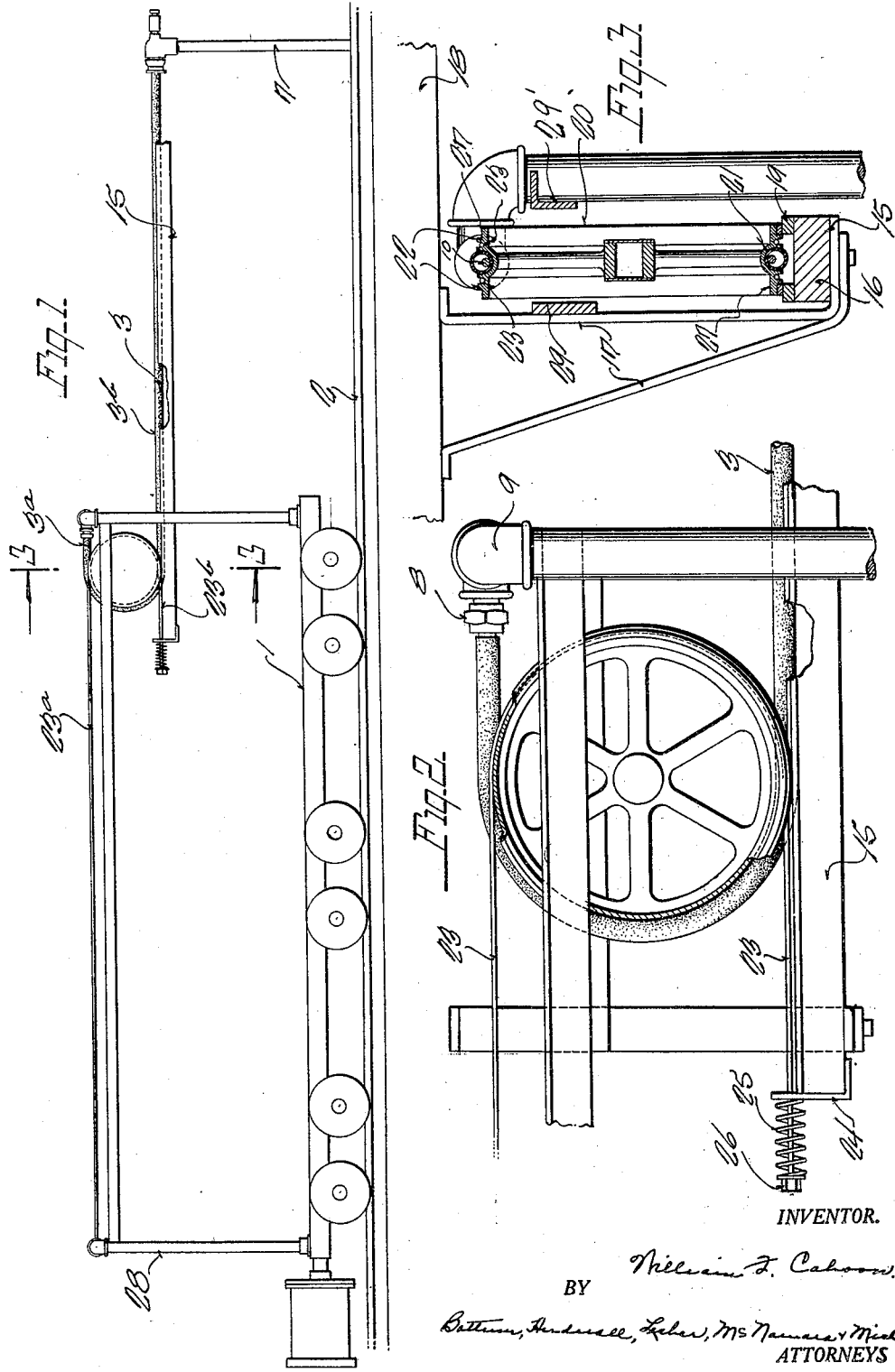
INVENTOR.
William F. Cahoon
BY
ATTORNEYS

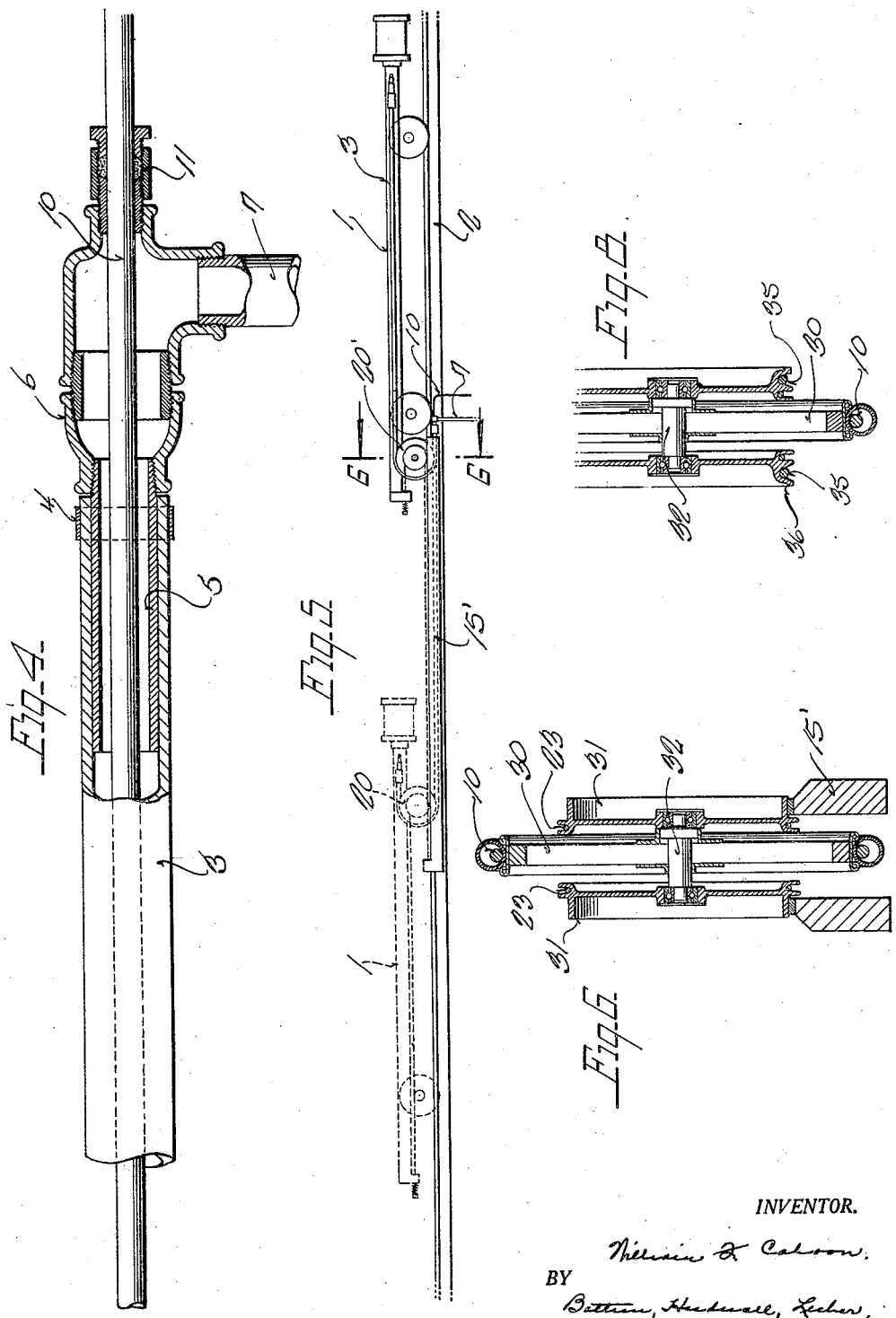

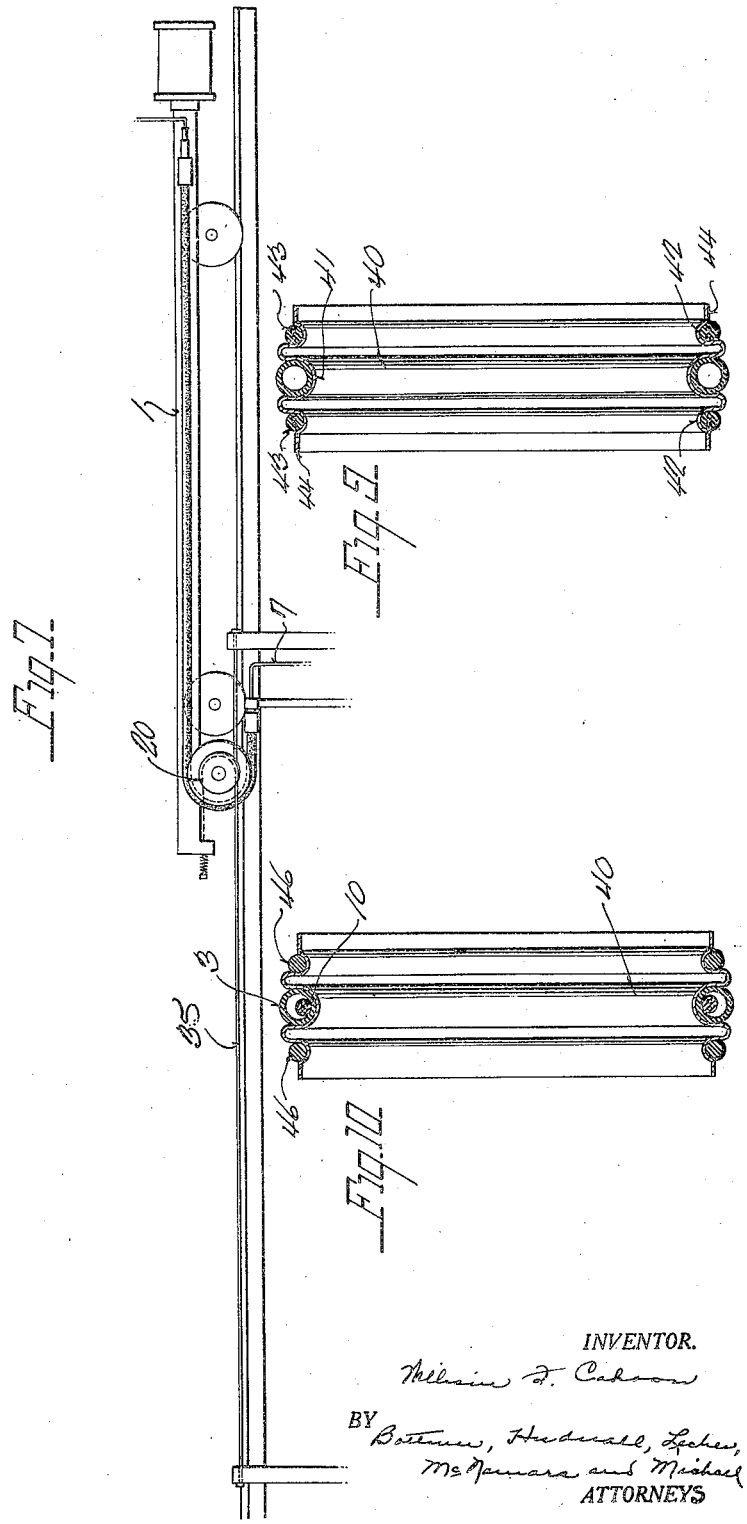

Patented Oct. 4, 1932

1,880,780

UNITED STATES PATENT OFFICE

WILLIAM F. CAHOON, OF BIRMINGHAM, ALABAMA, ASSIGNOR TO THE FILER & STOWELL COMPANY, OF MILWAUKEE, WISCONSIN, A CORPORATION OF WISCONSIN

TRANSMITTER FOR FLUID PRESSURE AND ELECTRIC CURRENT

Application filed August 17, 1931. Serial No. 557,513.

This invention relates in general, to transmission of motive fluid, such as compressed air, or electric current to instrumentalities carried on a movable platform or carriage, and is particularly designed for use in supplying compressed air and electric current to the instrumentalities employed on a sawmill carriage.

Modern sawmill carriages are frequently equipped with power operated dogs and set works. For example, the dogs may be operated by air motors and the set works by electric motors. Sawmill carriages are reciprocated or moved back and forth rapidly on the track, and the transmission of the compressed air and electric current to the air motors and electric motors on the carriage, presents a rather difficult problem, for the reason that the source of the compressed air and electric current must, for practicable purposes, be located at some stationary point adjacent to the track. For transmitting the compressed air, telescopic pipe arrangements have been employed, but these are unsatisfactory for the reason that they leak, and consequently waste the motive fluid, and for the further reason that they require constant maintenance to maintain them in workable condition. The transmission of the electric current to the carriage also presents a rather difficult problem.

The present invention proposes the elimination of the telescopic pipe arrangement, and substitution of an air supply hose leading from the stationary source of compressed air to the carriage and organized with a novel form of tensioning or take-up arrangement which operates to maintain the hose under light tension and against tangling, and to preclude the imposition thereon of any severe strain. The same means that exerts this controlling action on the air supply hose is also utilized to similarly control the cables or conductors through which electric current is supplied to the carriage.

In this way, leakage of the motive fluid is avoided, maintenance costs are reduced to a minimum, and a highly satisfactory power transmitting organization is provided.

In the present embodiments of the invention, the air hose as well as the electric cable, each have one end connected to their respective sources of power and such ends are necessarily stationary or fixed relative to the carriage. The other end of the air hose is connected to a fitting on the carriage which communicates through an appropriate distributing system to the air motors. The other end of the cable is also appropriately connected to the carriage. Extending parallel to the path of movement of the carriage and adjacent the hose and cable is a track on which freely rolls a wheel or sheave assembly. The air hose is curved or looped about one side of the sheave assembly so that two spaced runs are formed in the hose, one extending to the source of supply of the compressed air, and the other extending to the carriage. The electric cables are similarly associated with the wheel or sheave, and may be engaged with peripheral groove structures provided especially therefor or may be extended through the interior of the hose. In either event, when the carriage moves in one direction, it carries with it the end of the hose secured thereto, and thus pulls the hose around the wheel or sheave, causing the latter to roll in one direction along the track. As the carriage or wheel or sheave assembly thus moves the length of hose in one run automatically shortens and in the other run automatically lengthens to compensate for carriage movements. For reversely moving the sheave assembly, and consequently for reversely feeding the hose from one run into the other, the electric cables may be employed, or a separate set of special cables may be provided for this purpose. Whatever may be the particular expedient, the cables are reversely looped about the sheave assembly, and are related thereto and cooperated therewith exactly as the air hose with the exception that they move oppositely with respect to the hose.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a view in side elevation showing one embodiment of the invention, the sawmill being illustrated diagrammatically to simplify the illustration;

Figure 2 is a fragmentary view on an enlarged scale further illustrating certain of the parts shown in Figure 1, portions of the structure being broken away and portions shown in sections for the sake of illustration;

Figure 3 is a view in section taken on line 3—3 of Figure 1;

Figure 4 is a fragmentary detailed view partly in side elevation, and partly in section, showing the manner in which the air supply hose is connected to the source of supply of compressed air;

Figure 5 is a view in side elevation showing another embodiment of the invention, the sawmill carriage being illustrated diagrammatically;

Figure 6 is a detail view in vertical section taken on line 6—6 of Figure 5;

Figure 7 is a view in side elevation illustrating another modification of the invention;

Figure 8 is a fragmentary sectional view of another form of the invention;

Figure 9 is a sectional view showing still another form of the invention; and

Figure 10 is a view similar to Figure 9, but showing a slight variation of this type of structure.

Referring to the drawings, and more particularly to Figures 1 to 4 inclusive, the numeral 1 designates a sawmill carriage which is illustrated diagrammatically and which reciprocates on the usual track 2. For supplying motive fluid or electric current to the instrumentalities (not shown) and employed on the carriage, an air supply hose 3 is provided and has one end suitably clamped as at 4, about a bushing 5, connected through suitable fittings 6 to a pipe 7 which leads from a tank containing compressed air, from an air compressor or from any other suitable source of supply. The other end of the air supply hose 3 is connected by a coupling 8 with a stationary pipe 9 carried by the carriage, and connected in any suitable way to the distributing system (not shown) usually provided on the carriage and transmitting the compressed air to the air motors.

The supply conductor or electric cable employed for transmitting the electric current from the stationary source adjacent the carriage to the motors on the carriage is designated generally at 10. A portion of the cable 10 passes through a stuffing box or packing gland 11 and then extends longitudinally through the air supply hose 3 and out through a suitable stuffing box or packing gland on the pipe 9, and thence to the electric motors or the control systems therefor. The cable 10 is substantially smaller in diameter than the hose 3 and is a little longer than the hose so as to be relieved of strain.

Paralleling the path of movement of the sawmill carriage and disposed along and adjacent the hose 3 is a track designated generally at 15. The track 15 may be made up of a bar 16 supported in any suitable manner, as for instance, by hanger brackets 17, which are carried by an overhead supporting structure 18. On the bar 15 are strip-like rails 19.

A sheave or wheel assembly designated generally at 20 is mounted on the rails 19 so as to be free to roll therealong. The hose 3 is looped around and received in a portion of a peripheral groove 21 provided in the center of the sheave assembly 20 as clearly illustrated in Figures 1 to 3. On the opposite sides of the groove 21 the sheave assembly 20 is provided with flanged peripheral grooves designated at 22. The grooves 22 receive flexible wires or cables 23 which are looped about the sheave assembly reversely or oppositely with respect to the hose 3. One end of each wire 23 is yieldably anchored to a stationary structure, as for example, to an end of the bar 15. For this purpose a bracket 24 may be secured to the bar and formed with an aperture through which the ends of the wire project. On the projecting end of each wire, a coil spring 25 is arranged and is compressed between the bracket 24 and a nut 26 on its wire 23. The other end of each wire 23 is fixed to suitable structure on the sawmill carriage, as for example, to a standard or pipe 28. Suitable guard rails 29 and 29' may be provided for the sheave assembly 20. The sheave or pulley assembly 20 has flanges 27 which engage and roll along the rails 19.

With this arrangement, when the carriage moves from the position shown in Figure 1 toward the right as viewed in such figure, the end of the hose 3 adjacent coupling 8 is pulled with the carriage, and as a consequence, the sheave assembly 20 is rolled along the track to the right as viewed in Figure 1 to increase the length of the run 3$^a$ of the hose while decreasing the length of the run 3$^b$ thereof and thus compensate for the movement of the carriage and keep the hose 3 properly positioned and under very light tension. During the movement just described the pull of the sheave assembly 20 on the wires 23 and the movement of the carriage results in decrease in the length of the runs 23$^a$ of the wires and an increase in the length of the runs 23$^b$ thereof.

The form of the invention illustrated in Figures 5 and 6 is in all substantial respects very similar to that shown in Figures 1 to 4 and differs principally in that the hose, the sheave assembly for the hose, and the track are positioned down along the side of the wheels of the carriage and below the carriage platform rather than about the latter. There is also some variation in the particular structure of the sheave assembly. As in the other form of the invention, there is a sawmill carriage 1 which runs on a track 2 and also an air supply hose 3 through which the electric cable 10 extends. The sheave assembly is designated generally at 20' and runs on the track designated generally at 15'.

The sheave assembly 20' includes a center sheave 30 and a pair of outer sheaves 31, the sheaves 30 and 31 being independently rotatable about a common shaft or axis 32. The interconnection of the sheaves in such manner as to permit them to rotate independently of each other makes it possible to employ sheaves of different diameter. However, as the sheaves are interconnected for rotation about a common axis, the pull of the hose on the sheave 30 causes the entire assembly to roll along the track and the pull of the cables 23 on the sheaves 31 causes reverse rolling of the assembly just as the other embodiment of the invention.

In the embodiment illustrated in Figures 7 and 8 the structure is exactly the same as that shown in Figures 5 and 6, except that the track is constituted of wires or rods designated at 35 and that the sheave or pulley assembly designated at 30' has peripheral grooves 36 in which the wires or rods 35 are received. It is obvious that this track structure may be employed with the form of the invention in Figures 1 to 4 or with other forms.

In Figure 9 the sheave assembly is shown as stamped from a single piece of metal, and is designated at 40. With this sheave there is a central peripheral groove 41 for the hose 3 and side peripheral grooves 42 for cables designated at 43. The sides of the sheave assembly are formed with flat flanges as indicated at 44 and are designed for engagement with the rails of the track. As shown in Figure 9, the cables 43 may be constituted to serve as electrical conductors. This has the advantage of eliminating the stuffing boxes at the ends of the hose 3 and makes it possible to use a smaller hose, and further, prolongs the life of the hose as there is no inside wear. However, it has the disadvantage of increasing the hazard of short circuits and fire caused by broken cables although this hazard could be reduced by lubricating the conductor and by resorting to other expedients.

Figure 10 shows the rim structure of Figure 9 with ordinary steel cables 46 for rolling the sheave assembly in one direction and with the electrical cable 10 extending through the hose 3 as in the other embodiment of the invention.

In all embodiments of the invention a practicable and very satisfactory means is provided for transmitting electric current and fluid under pressure to the sawmill carriage. It is to be understood that while several embodiments of the invention have been shown and described, that these embodiments have been selected merely for the purpose of illustration and that various changes in the size, shape and arrangement of the parts may be made without departing from the spirit of the invention or the scope of the subjoined claims.

The invention claimed is:

1. In combination with a reciprocable carriage having air driven instrumentalities thereon and a stationary source of air pressure adjacent to said carriage, a flexible supply conduit connected at one end to said carriage and its other end to said source, a floating wheel having looping engagement with said conduit and a flexible line anchored at one end and connected at its other end to said carriage and reversely looped about said wheel whereby upon movement of said carriage in either direction the hose is maintained in the proper position and appropriately taut.

2. In combination with a sawmill carriage, a flexible air supply line therefor, and means actuated by the pull of the carriage on the supply line and forming a travelling loop in the supply line as the carriage moves back and forth whereby to maintain the supply line appropriately taut and in proper position in any position of the carriage.

3. In combination with a sawmill carriage, a power supply line therefor, and means actuated by the carriage and forming a travelling loop in said supply line to maintain the supply line properly taut and properly positioned in all positions of the carriage.

4. In combination with a sawmill carriage a power supply line therefor, and means actuated by the carriage and forming a travelling loop in said supply line to maintain the supply line properly taut and properly positioned in all positions of the carriage and including a floating sheave engaged with the supply line.

5. In combination with a sawmill carriage, a power supply line therefor, and means actuated by the carriage and forming a travelling loop in said supply line to maintain the supply line properly taut and properly positioned in all positions of the carriage and including a floating sheave engaged with the supply line and flexible elements reversely looped about said sheave and having ends connected to the carriage and to fixed points.

6. In combination with a sawmill carriage, a flexible air supply pipe having one end connected to a stationary source of compressed air supply and having its other end connected to the carriage, a track paralleling the path of travel of the carriage and disposed adjacent said pipe, a wheel rollable along said track and engaged with said pipe to loop the same and form spaced runs, one of which feeds into the other to maintain a light tension on the hose as the carriage moves in one direction, and means for reversely moving the wheel and reversely feeding the runs as the carriage moves in the opposite direction.

7. In combination with a sawmill carriage, a flexible air supply pipe having one end connected to a stationary source of compressed air supply and having its other end connected to the carriage, a track paralleling the path of travel of the carriage and disposed adjacent said pipe, a wheel rollable along said track and engaged with said pipe to loop the same and form spaced runs, one of which feeds into the other to maintain a light tension on the hose as the carriage moves in one direction, and a cable reversely looped about said wheel and having one end anchored to a structure fixed with respect to the carriage and having its other end fixed to the carriage for reversely rolling the wheel and reversely feeding the runs when the carriage moves in the opposite direction.

8. In combination with a sawmill carriage, a flexible power supply line having one end connected to a power source and having its other end connected to the carriage, a sheave about which said flexible power supply line is looped, means constraining the sheave to rolling movement along a path paralleling the path of movement of the carriage, said power supply line rolling said sheave in one direction along its path when the carriage moves in one direction, and means for rolling said sheave in opposite direction when the carriage moves in an opposite direction.

9. In combination with the sawmill carriage, a fluid pressure supply system having a hose connected at one end to a source of supply and at its other end to the carriage, a sheave about which the hose is looped, a track on which the sheave rolls, and a flexible element having one end connected to a fixed point and its other end connected to the carriage and its intermediate portion engaged with the sheave for rolling the sheave in one direction along the track.

10. A device of the character described including a reciprocable carriage, a track paralleling the path of travel over the carriage, a wheel rollable along said track, a flexible power supply line having one end connected to a fixed source of supply, its other end connected to the carriage and its intermediate portion looped around said wheel whereby when said carriage moves in one direction the flexible supply line will roll the wheel along the track and the wheel will serve as a take-up for the power supply line, and means for rolling the wheel in an opposite direction when the carriage moves in an opposite direction to cause the wheel to again serve as a take-up for the flexible power supply line.

11. A device of the character described comprising a reciprocable carriage, a track paralleling the path of travel of the carriage, a wheel rollable along said track, a flexible air supply line having one end connected to a stationary source of fluid under pressure, its other end connected to the carriage, and its intermediate portion looped about said wheel and flexible means reversely looped about said wheel having one end anchored at a fixed point and its other end connected to the carriage.

12. A device of the character described comprising a reciprocable carriage, a track paralleling the path of travel of the carriage, a wheel rollable along said track, a flexible air supply line having one end connected to a stationary source of fluid under pressure, its other end connected to the carriage, and its intermediate portion looped about said wheel, flexible means reversely looped about said wheel having one end anchored at a fixed point and its other end connected to the carriage, and an electric cable extending through said flexible air supply pipe.

13. A device of the character described including a reciprocable carriage, a flexible power supply line having one end connected to the carriage and its other end connected to a fixed power source, and a rollable take-up actuated by the carriage and coacting with an intermediate portion of the power supply line to maintain the power supply line properly taut and properly positioned in all positions of the carriage.

In witness whereof, I hereto affix my signature.

WILLIAM F. CAHOON.